US011222161B1

(12) United States Patent
Harvey

(10) Patent No.: US 11,222,161 B1
(45) Date of Patent: Jan. 11, 2022

(54) GRID MAGNIFIER

(71) Applicant: Hexagon Technology Center GmbH, Heerbrugg (CH)

(72) Inventor: Keith D. Harvey, Huntsville, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 0 days.

(21) Appl. No.: 16/920,066

(22) Filed: Jul. 2, 2020

(51) Int. Cl.
| G06F 40/103 | (2020.01) |
| G06F 16/22 | (2019.01) |
| G06F 16/2457 | (2019.01) |
| G06F 16/25 | (2019.01) |

(52) U.S. Cl.
CPC .......... *G06F 40/103* (2020.01); *G06F 16/221* (2019.01); *G06F 16/2282* (2019.01); *G06F 16/2457* (2019.01); *G06F 16/252* (2019.01)

(58) Field of Classification Search
None
See application file for complete search history.

(56) References Cited

U.S. PATENT DOCUMENTS

| 5,604,854 | A | 2/1997 | Glassey |
| 6,626,959 | B1 | 9/2003 | Moise et al. |
| 7,236,979 | B2 | 6/2007 | Pratley et al. |
| 7,933,862 | B2 | 4/2011 | Chamberlain et al. |
| 8,635,547 | B2 * | 1/2014 | Otsuka ................ H04N 5/44 |
| | | | 715/768 |
| 8,832,588 | B1 * | 9/2014 | Kerzner ................ G06F 3/0481 |
| | | | 715/781 |
| 9,007,405 | B1 * | 4/2015 | Eldar .................... G06F 3/0485 |
| | | | 345/666 |
| 9,317,182 | B2 | 4/2016 | Bernstein et al. |
| 10,025,466 | B2 * | 7/2018 | Santos-Gomez ... G06F 3/04847 |
| 2008/0082938 | A1 * | 4/2008 | Buczek .................. G06F 40/18 |
| | | | 715/784 |
| 2009/0040240 | A1 * | 2/2009 | Grotjohn ............... G06F 3/0481 |
| | | | 345/689 |
| 2010/0283800 | A1 * | 11/2010 | Cragun ................ G09B 21/008 |
| | | | 345/661 |
| 2011/0283228 | A1 * | 11/2011 | Hiraiwa ................ G06F 3/0481 |
| | | | 715/808 |
| 2011/0289397 | A1 * | 11/2011 | Eastmond .............. G06Q 10/10 |
| | | | 715/212 |
| 2013/0055167 | A1 * | 2/2013 | Leong .................. G06F 16/9038 |
| | | | 715/854 |
| 2014/0033093 | A1 * | 1/2014 | Brauninger ............. G06F 40/18 |
| | | | 715/765 |
| 2014/0157101 | A1 * | 6/2014 | Hogan .................. G06F 40/177 |
| | | | 715/227 |

(Continued)

OTHER PUBLICATIONS

[No Author Listed] Wikipedia: Definition Tooltip. Last edited Sep. 28, 2019. Retrieved from the Internet inder <https://en.wikipedia.org/wiki/Tootip%20> on Jan. 15, 2020 (2 pages).

*Primary Examiner* — Howard Cortes
(74) *Attorney, Agent, or Firm* — Nutter McClennen & Fish LLP

(57) ABSTRACT

Various embodiments improve the legibility of a column of data, displayed at an initial size in a grid, by magnifying the column, while maintaining neighboring columns at their initial size, and maintaining the magnified column in the context of neighboring columns.

20 Claims, 10 Drawing Sheets

(56) References Cited

U.S. PATENT DOCUMENTS

| | | | |
|---|---|---|---|
| 2014/0215385 A1* | 7/2014 | Sauermann | G06F 3/0481 715/786 |
| 2014/0237343 A1* | 8/2014 | Villani | G06F 40/177 715/227 |
| 2014/0289601 A1* | 9/2014 | Wang | G06F 40/18 715/217 |
| 2014/0344736 A1* | 11/2014 | Ryman | G06F 3/04842 715/767 |
| 2015/0067463 A1* | 3/2015 | Chin | G06F 40/177 715/212 |
| 2015/0089340 A1* | 3/2015 | Logan | G06F 3/0484 715/212 |
| 2018/0307401 A1* | 10/2018 | Carey | G06F 3/017 |

* cited by examiner

| Column 0 | Column 03 | umn 04 |
|---|---|---|
| Data 01 | This is a much longer set of data 01 used to show how rows are automatically resized to allow data to wrap. | 01 |
| Data 02 | This is a much longer set of data 02 used to show how rows are automatically resized to allow data to wrap. | 02 |
| Data 03 | This is a much longer set of data 03 used to show how rows are automatically resized to allow data to wrap. | 03 |
| Data 04 | This is a much longer set of data 04 used to show how rows are automatically resized to allow data to wrap. | 04 |
| Data 05 | This is a much longer set of data 05 used to show how rows are automatically resized to allow data to wrap. | 05 |
| Data 06 | This is a much longer set of data 06 used to show how rows are automatically resized to allow data to wrap. | 06 |
| Data 07 | This is a much longer set of data 07 used to show how rows are automatically resized to allow data to wrap. | 07 |
| Data 08 | This is a much longer set of data 08 used to show how rows are automatically resized to allow data to wrap. | 08 |

Fig. 2B

Figure 3B:
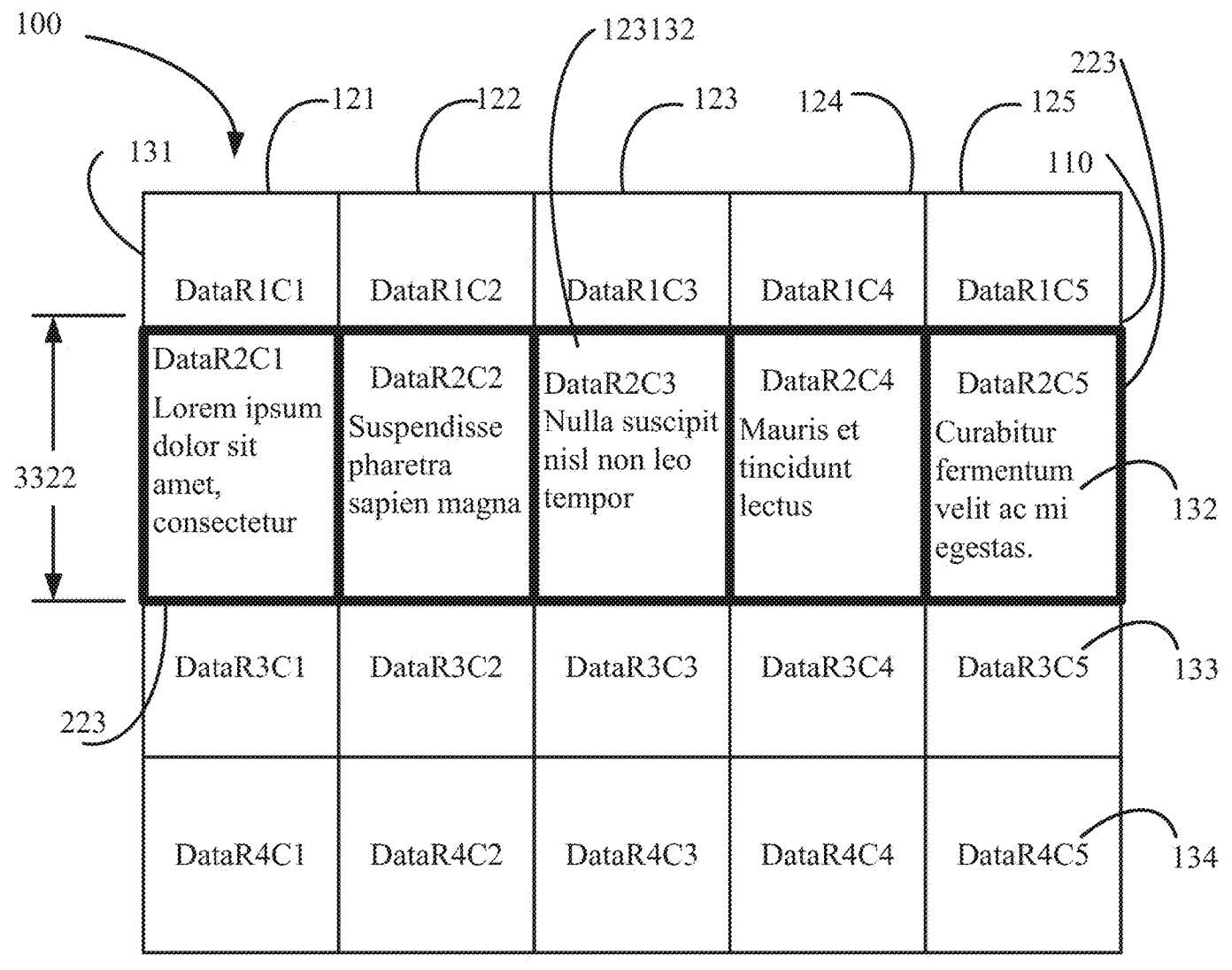

| | DataR1C1 | DataR1C2 | DataR1C3 | DataR1C4 | DataR1C5 |
|---|---|---|---|---|---|
| | DataR2C1 Lorem ipsum dolor sit amet, consectetur | DataR2C2 Suspendisse pharetra sapien magna | DataR2C3 Nulla suscipit nisl non leo tempor | DataR2C4 Mauris et tincidunt lectus | DataR2C5 Curabitur fermentum velit ac mi egestas. |
| | DataR3C1 | DataR3C2 | DataR3C3 | DataR3C4 | DataR3C5 |
| | DataR4C1 | DataR4C2 | DataR4C3 | DataR4C4 | DataR4C5 |

GRID MAGNIFIER

TECHNICAL FIELD

The present disclosure relates to computer graphical user interfaces, and, more particularly, to displaying data grids.

BACKGROUND ART

It is known in the art to display data in a grid format, such as a table in a word processing document, or a spreadsheet in a spreadsheet document. For example, a data grid typically includes a plurality of data cells, each displaying associated cell data.

Often it is important to a user that the cells of a grid be displayed within the context of other cells. For example, when a data grid includes a center column of cells and two neighboring columns of cells (i.e., one to the left of the center column, and another to the right of the center column), it may be important to a user to display the center column between the two neighboring columns, to keep data of the center column within the context of its neighboring columns.

Data grids often need to be displayed in constrained spaces. While cells of a data grid displayed on the large screen of a desktop computer may readily legible to a user, the same cells displayed in the same grid on a smaller screen would be less legible, or perhaps illegible, to the same user for example because the cells, and font size of characters within such cells, of the grid appears smaller on the smaller screen. The problems are exacerbated for older users, and/or for users operating tablet computers or smartphones. The problem may also be exacerbated if an application displaying the data grid truncates data in one or more data cells.

SUMMARY OF VARIOUS EMBODIMENTS

In accordance with an illustrative embodiment, a computer-implemented method for increasing legibility of data displayed on a computer display includes displaying a plurality of columns of data simultaneously on the computer display, each column in the plurality of columns comprising a plurality of contiguous cells, each column in the plurality of columns having a respective first width according to a first display format. The method also includes receiving, at the computer, a first user input identifying a first user-selected column from among the plurality of columns, the plurality of columns other than the first user-selected column defining a plurality of remaining columns. The method also includes, in response to the first user input, changing the format of the first user-selected column to a second display format by: expanding the width of the first user-selected column to a second width, and keeping each of the remaining columns according to their respective first width, and lifting-up the first user-selected column so that the first user-selected column overlaps at least a portion of another column of data from the plurality of columns of data; and re-displaying the plurality of columns of data simultaneously on the computer display, the first user-selected column displayed according to the second display format.

In some embodiments, the user input includes a touch from one of a touch-screen or mouse input from a computer mouse.

In some embodiments, displaying the plurality of columns includes displaying the plurality of columns as a contiguous grid comprising the plurality of columns.

Some embodiments of the method also include, after re-displaying the plurality of columns of data simultaneously on the computer display (the user-selected column displayed according to the second display format): receiving, at the computer, a second user input identifying a second user-selected column from among the plurality of columns, and in response to the second user input: (a) reducing the second width of the first user-selected column so that the first user-selected column has a first reduced width; and (b) changing the format of the second user-selected column to a third display format by: expanding the first width of the second user-selected column to a third width greater than its first width, and lifting-up the second user-selected column so that the second user-selected column overlaps at least a portion of another column of data from the plurality of columns of data. Such embodiments also include re-displaying the plurality of columns of data simultaneously on the computer display, the first user-selected column displayed according to its first reduced width, and the second user-selected column displayed according to the third display format.

In some embodiments, changing the format of the first user-selected column to a second display format further includes displaying a shadow around a perimeter of the first user-selected column so that the first user-selected column appears to hover above a portion of another column of data from the plurality of columns of data.

In some embodiments, expanding the width of the first user-selected column includes animating the user-selected column to lift-up and expand.

In some embodiments, in the first format, at least one cell in the first user-selected column displays a truncated version of that cell's data content; and in the second format, said at least one cell displays a less-truncated version of that cell's data content.

In some embodiments, receiving user input identifying the first user-selected column defines a set of adjacent columns immediately adjacent to the user-selected column; and the first user-selected column, when displayed in the second format, partially but not completely obscures at least one immediately adjacent column from the set of adjacent columns.

In some embodiments, text in at least one cell of the first user-selected column is editable, when the first user-selected column is displayed in the second format.

In some embodiments, the first user-selected column includes a plurality of cells, and text in each cell of the first user-selected column is editable, when the first user-selected column is displayed in the second format.

In some embodiments, each column of the remaining plurality of columns remains in its initial location when the first user-selected column is displayed in the second format.

In some embodiments, the method also includes receiving, at the computer processor, subsequent user input instructing the computer to revert the display of the first user-selected column to the first display format; and causing the computer to re-display the plurality of columns simultaneously on the computer display, the first user-selected column displayed according to the first display format.

Another embodiment includes a computer-implemented system configured to increase legibility of data displayed on a computer display. In one such embodiments, the system includes a display driver configured to display, on the computer display, a plurality of data columns, each column in the plurality of data columns comprising a plurality of contiguous cells, the display driver configured to display the plurality of data columns in a first format at a first time, and to display the plurality of data columns in a second format at a second time. In such embodiments, in the first format, each data column of the data columns has a respective first column width; and in the second format, a user-selected one of the data columns has a column perimeter, and has a second column width, the second column width being greater than its first column width, and has a halo around the column perimeter, and is displayed so that the user-selected column appears to hover above at least a portion of another column from the plurality of displayed data columns.

Such a system also has a user input module configured to receive, from an operator of the system after displaying the plurality of data columns in the first format at the first time, specification of a one of the columns as the user-selected column.

Such a system also has a formatting module configured to: controllably reformat the user-selected column from the first format to the second format, in response to the user input; and provide, to the display driver, the user-selected column in the second format for display, at the second time, on the computer display.

In some system embodiments, the display driver is configured to display, in each of the first format and the second format, the plurality of columns as a contiguous grid.

In some system embodiments, in the second format, the user-selected column is animated to lift-up and expand to the second column width.

In some system embodiments, specification of a one of the columns as the user-selected column defines a set of adjacent columns adjacent to the selected column; and the user-selected column, when displayed in the second format, at least partially obscures at least one adjacent column from the set of adjacent columns.

In some system embodiments, text in at least one cell of the user-selected column is editable, when the user-selected selected column is displayed in the second format.

Yet another embodiment includes a non-volatile computer-program product storing computer-executable code, which computer-executable code, when executed by a computer processor, causes the computer processor to perform a method. The method includes displaying a plurality of columns of data simultaneously on a computer display, each column in the plurality of columns comprising a plurality of contiguous cells, each column in the plurality of columns having a respective first width according to a first display format. The method also includes receiving, at the computer processor, user input identifying a first user-selected column of data from among the plurality of columns of data. The method also includes changing the format of the user-selected column to a second display format by: expanding the first width of the first user-selected column, and lifting-up the user-selected column and adding a shadow around a perimeter of the user-selected column so that the user-selected column appears to hover above at least a portion of another column of data from the plurality of columns of data. The method also includes subsequently re-displaying the plurality of columns of data simultaneously on the computer display, the first user-selected column displayed according to the second display format and the columns other than the user-selected column displayed according to the first display format.

In some embodiments, the method includes displaying the plurality of columns as a contiguous grid comprising the plurality of columns.

In some embodiments, the first user-selected column includes a plurality of contiguous cells, and text in each cell of the user-selected column is editable, when the first user-selected column is displayed in the second format.

BRIEF DESCRIPTION OF THE DRAWINGS

The foregoing features of embodiments will be more readily understood by reference to the following detailed description, taken with reference to the accompanying drawings, in which:

FIG. 2B schematically illustrates another embodiment of a data grid displayed on a computer screen;

FIG. 3B schematically illustrates an embodiment of a data grid displayed on a computer screen.

FIG. 4A and FIG. 4B schematically illustrate operation of an embodiment of changing a display of a data grid on a computer screen;

DETAILED DESCRIPTION OF SPECIFIC EMBODIMENTS

Figure 1A:
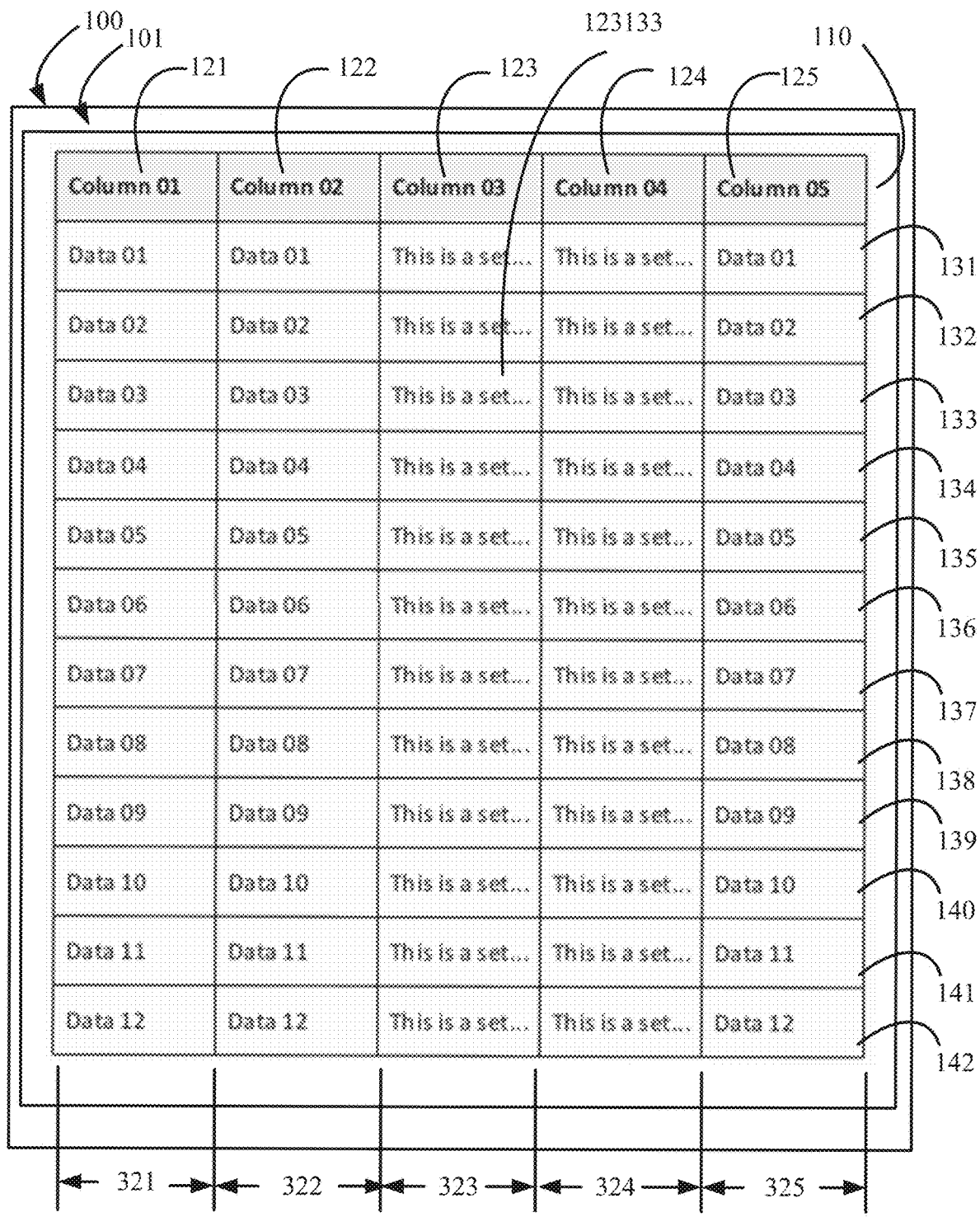
FIG. 1A schematically illustrates an embodiment of a data grid displayed on a computer screen.

Various embodiments improve the legibility of a column (or row) of data, displayed at an initial size in a grid, by magnifying the column (or row) of the grid, while maintaining neighboring columns (and rows) of the grid at their initial size, and maintaining the magnified column or row in the context of neighboring columns or rows.

Some spreadsheet software allows a user to select one or more cells in a spreadsheet, and then increase the apparent size of those selected cells to make the display of those cells occupy more screen area. Such operations increase the apparent size of not only the selected cells, but other cells that remain displayed on the screen.

A consequence of such operations, typically, is that some cells of data that were visible prior to the operations are no longer displayed after the operations. In other words, it is as if some cells that were visible prior to the operations are displaced offscreen by the enlarged cells. That consequence is a shortcoming of prior art display technologies, particularly when it is important to a user that the cells whose size has been increased be displayed within the context of other cells after the operations. For example, when a data grid includes a center column of cells and two neighboring columns of cells (i.e., one to the left of the center column, and another to the right of the center column), it may be important to a user to display the center column between the two neighboring columns, to keep data of the center column within the context of the data in its neighboring columns.

Illustrative embodiments offer an improvement over such technology by increasing the apparent size of a column or row of data, while still displaying at least a portion of each column and row displayed prior to that increase.

Definitions. As used in this description and the accompanying claims, the following terms shall have the meanings indicated, unless the context otherwise requires.

A "set" includes at least one member. For example, a set of columns includes at least one column, and a set of rows includes at least one row.

A "column" is an ordered plurality of cells configured vertically with respect to one another.

A "row" is an ordered plurality of cells configured horizontally with respect to one another.

A "data grid" is a matrix of data including at least one column and a plurality of rows, or at least one row and a plurality of columns, or a plurality of columns and a plurality of rows.

A column is "lifted-up," relative to a previous position, when perimeter of the column in a subsequent position overlaps at least one adjacent column, for example when the column's width is expanded. A row is "lifted-up," relative to a previous position, when perimeter of the row in a subsequent position overlaps at least one adjacent row, for example when the row's height is increased.

A column "hovers" (e.g., above an adjacent column) when the column includes a shadow or halo, for example when the column is lifted-up. A row "hovers" (e.g., above an adjacent row) when the row includes a shadow or halo, for example when the row is lifted-up.

FIG. 1A schematically illustrates an embodiment of a data grid 110 displayed on a computer screen 100. In embodiments described herein, the data grid 110 may be displayed in a window 101 on the computer screen 100. Some embodiments are illustrated and described in terms of display on a computer screen 100, with the understanding that such displays may be in a window 101.

The data grid 110 in this illustrative embodiment includes a plurality of columns numbered 121, 122, 123, 124, and 125. Each column has an initial width, 321, 322, 323, 324, and 325 respectively.

Figure 1C:
FIG. 1C schematically illustrates an embodiment of a data column having a contiguous plurality of cells.
Figure 1B:
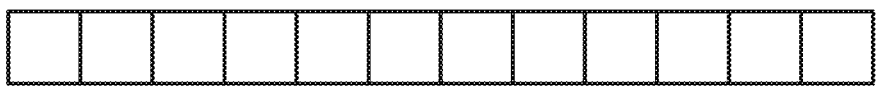
FIG. 1B schematically illustrates an embodiment of a data column having a contiguous plurality of cells.

Each column includes a plurality of cells. FIG. 1B schematically illustrates an embodiment of a data column having a contiguous plurality of cells, using column 123 as an illustrative example.

Each column in the embodiment of FIG. 1A has at least one immediately adjacent column. For example, column 121 is immediately adjacent to column 122. Column 122 is immediately adjacent to column 121 on one side of column 122, and is immediately adjacent to column 123 on the other side of column 122.

The data grid 110 in this illustrative embodiment includes a plurality of rows, numbered 131, 132, 133, 134, 135, 136, 137, 138, 139, 140, 141 and 142, respectively.

Each row has a plurality of cells. FIG. 1C schematically illustrates an embodiment of a row having a contiguous plurality of cells, using row 133 as an illustrative example. Note that cell 123133 is in both column 123 and row 133.

At least some of the cells in FIG. 1A contains editable data. For example, cell 123133 includes the following text data: "This is a set of longer data 03," but that text is truncated in FIG. 1A so that not all of that text is visible to a user.

Figure 2A:
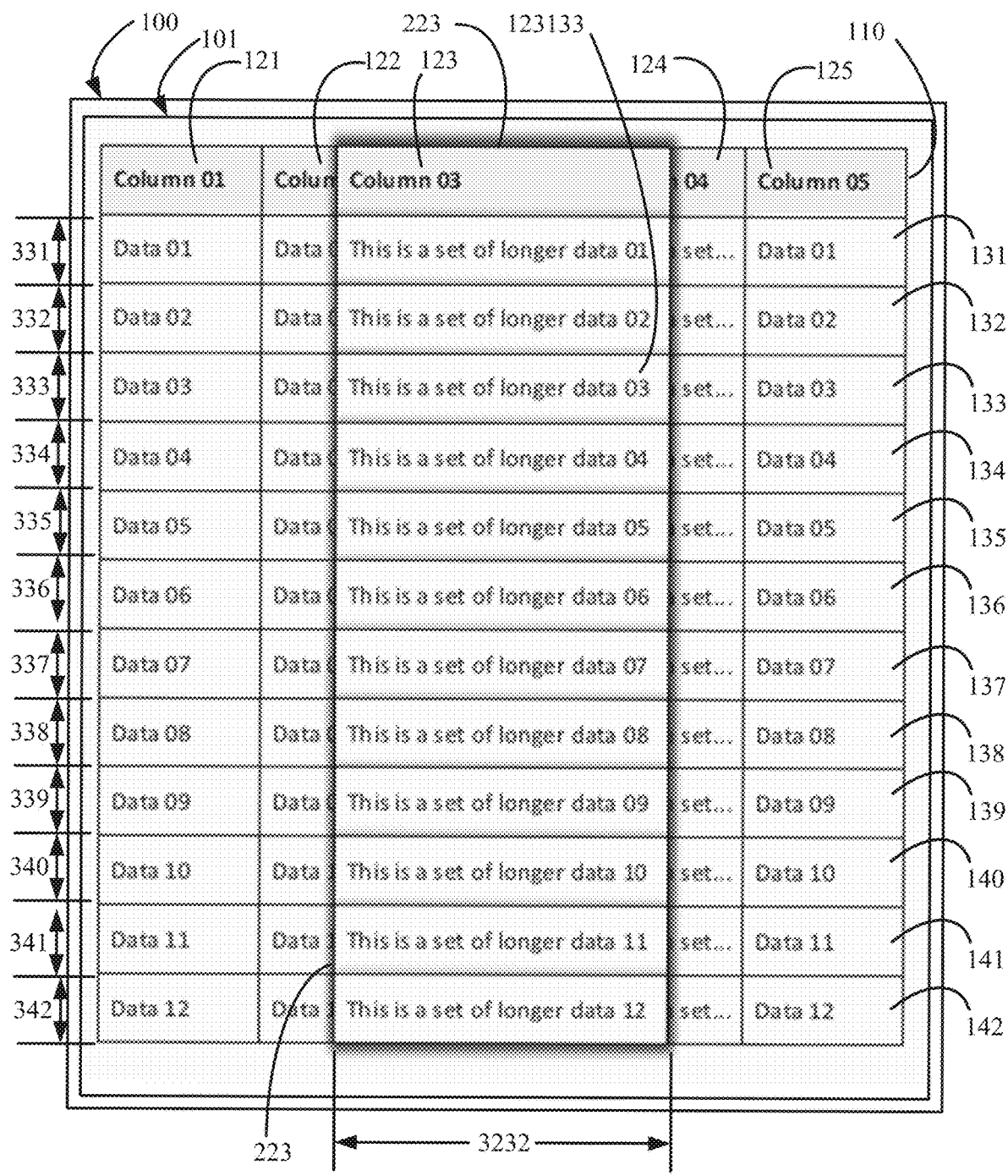
FIG. 2A schematically illustrates an embodiment of a data grid displayed on a computer screen.

FIG. 2A schematically illustrates an embodiment of the data grid 110 displayed on computer screen 100 according to an embodiment. In this embodiment, the display format of the grid has changed from the first display format of FIG. 1A to a second display format of FIG. 2A. Specifically, the appearance of column 123 has changed, relative to its appearance in FIG. 1A, in that the width 323 of column 123 in FIG. 1A has been expanded to a second width 3232 (i.e., column 123 is wider in FIG. 2A than its width in FIG. 1A). In addition, the appearance of column 123 has changed, relative to its appearance in FIG. 1A in that column 123 has a shadow or halo 223 around the perimeter of the displayed column on the screen 100.

In addition, the column 123 in FIG. 2A appears to overlap portions of its two immediately adjacent columns, column 122 on the left of column 123, and column 124 on the right of column 123. As schematically illustrated in FIG. 2A, in visual effect, due to its overlap of at least one adjacent column and the shadow 223, the column 123 appears to have been lifted-up so that the column 123 appears to be hovering above the remainder of the data grid 110. In other words, column 123 is displayed such that it appears to be hovering above at least a portion of another column of data from the plurality of columns of data. Consequently, the appearance of the grid 110 in FIG. 2A may be said to be three-dimensional, even if the screen 110 is only a two-dimensional screen. The foregoing changes, individually and collectively, have the benefit of making column 123, and the data in its cells, more easily visible to a user. In other words, the change in appearance of column 123 has enhanced its legibility.

It should be noted that, in FIG. 2A, the width of the other columns (columns 121, 122, 124 and 125) have not changed. The dimensions of column 123 may be said to have changed relative to the dimensions of those remaining columns.

Moreover, it should be noted that those other columns (which may be referred-to as the "remaining" columns) are still displayed on the screen 100. In other words, none of those remaining columns (121, 122, 124 and 125) have been displaced from other otherwise removed from the display on the screen 100. Consequently, and beneficially, column 123 is still displayed in the context of those other columns. Also, the data in the cells of column 123 are displayed in the context of the data of those other columns.

It should also be noted that, in FIG. 2A, more of the data (e.g., text) of cell 123133 is visible than is visible in that cell in FIG. 1A. In other words, the data (e.g., text) of cell 123133 in FIG. 2A is less truncated that in that cell in FIG. 1A. Moreover, in preferred embodiments, the data of cell 123133 is editable within that cell by a user. For example, a user could, using conventional means (e.g., a mouse or a touch-screen), place a cursor in cell 123133 and edit the content of that cell.

FIG. 2B schematically illustrates another embodiment of data grid 110 displayed on the computer screen 100. In this embodiment, column 123 has been expanded and lifted-up, as in FIG. 2A. In the embodiment of FIG. 2B, however, the height of each row (131, 132, 133, 134, 135, 136, 137 and 138) has also been increased. Beneficially, this allows each cell in column 123 to display even more of its data. This means, however, that some rows of column 123 may be displaced off-screen. For example, relative to FIG. 2A, rows in FIG. 2B 139, 140, 141 and 142 are no longer visible on-screen. Some embodiments, however, enlarge the window 101 in which the data grid 110 is displayed so that all such rows remain displayed.

Figure 3A:
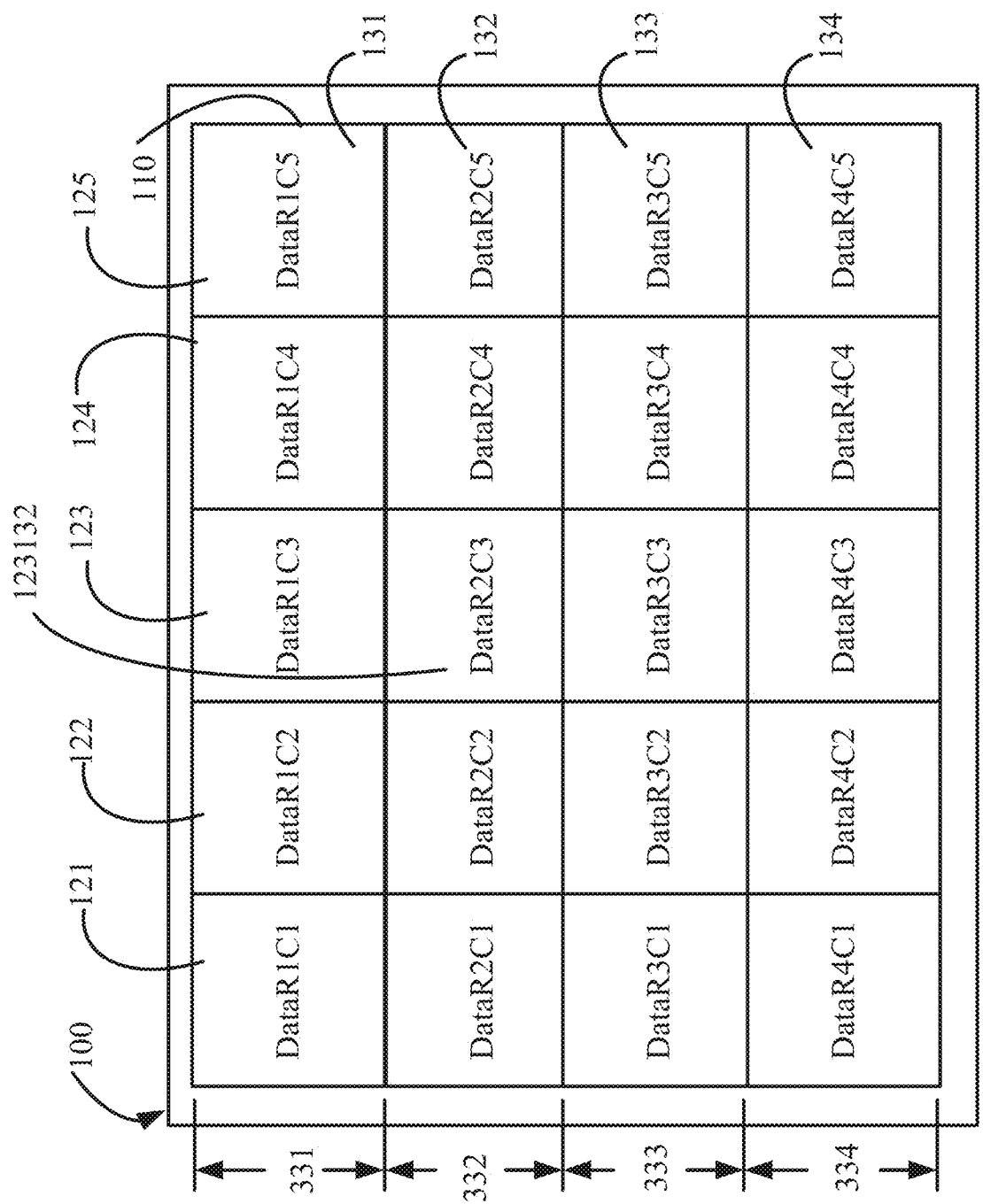
FIG. 3A schematically illustrates an embodiment of a data grid displayed on a computer screen.

FIG. 3A schematically illustrates an embodiment of a data grid 110 displayed on a computer screen 100 according to first format. The data grid 110 in this embodiment includes a plurality of columns 121, 122, 123, 124 and 125 and a plurality of rows 131, 132, 133 and 134. Each row has an initial height, 331, 332, 333, and 334 respectively.

FIG. 3B schematically illustrates an embodiment of the data grid 110 displayed on computer screen 100 according to an embodiment. In this embodiment, the display format of the grid has changed from the first display format of FIG. 3A to a second display format of FIG. 3B. Specifically, the appearance of row 132 has changed, relative to its appearance in FIG. 3A, in that the height 332 of row 132 in FIG. 3B has been increased to a second height 3322 (i.e., row 132 is taller in FIG. 3B, relative to the other rows, than its height in FIG. 3A). In addition, the appearance of row 132 has changed, relative to its appearance in FIG. 3A in that row 132 has a shadow or halo 223 around the perimeter of the displayed row on the screen 100.

In addition, the row 132 in FIG. 3B appears to overlap portions of its two immediately adjacent rows, row 131 above row 132, and row 133 below row 132. As schematically illustrated in FIG. 3B, in visual effect, due to its overlap of at least one adjacent row and the shadow 223, the row 132 appears to have been lifted-up so that the row 132 appears to be hovering above the remainder of the data grid 110. Moreover, due to its shadow 123, row 132 is displayed such that it appears to be hovering above at least a portion of another row of data from the plurality of rows of data. Consequently, the appearance of the grid 110 in FIG. 3B may be said to be three-dimensional, even if the screen 100 is only a two-dimensional screen. The foregoing changes, individually and collectively, have the benefit of making row 132, and the data in its cells, more easily visible to a user. In other words, the change in appearance of row 132 has enhanced its legibility.

It should be noted that, in FIG. 3B, the size (e.g., height) of the other rows (rows 131, 133 and 134) has not changed relative to one another. The dimensions of row 132 may be said to have changed relative to the dimensions of those remaining rows.

Moreover, it should be noted that those other rows (which may be referred-to as the "remaining" rows) are still displayed on the screen 100. In other words, none of those remaining rows (131, 133 and 134) have been displaced from other otherwise removed from the display on the screen 100. Consequently, and beneficially, row 132 is still displayed in the context of those other rows. Also, the data in the cells of row 132 are displayed in the context of the data of those other rows.

It should also be noted that, in FIG. 3B, more of the data (e.g., text) of cell 123132 is visible than is visible in that cell in FIG. 3A. Moreover, in preferred embodiments, the data of cell 123132 is editable within that cell by a user. For example, a user could, using conventional means (e.g., a mouse or a touch-screen), place a cursor in cell 123132 and edit the content of that cell.

Figure 5A:
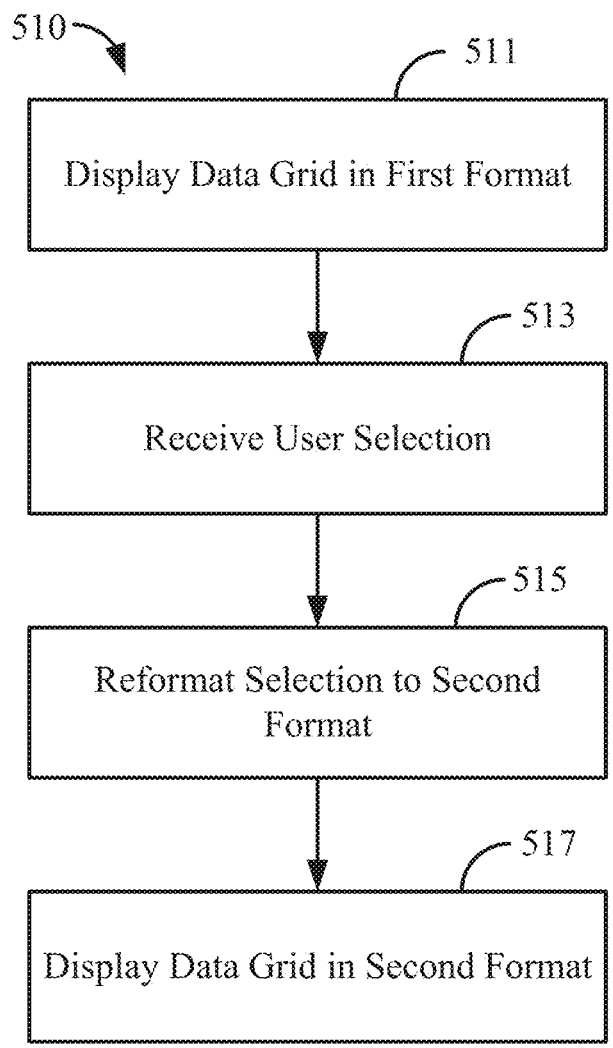
FIG. 5A is a flowchart of a method for an embodiment of changing a display of a data grid on a computer screen.

FIG. 5A is a flowchart of an embodiment of a method 510 of changing a display of a data grid on a computer screen. The method 510 may be applied to change the display of a user-selected column or a user-selected row.

Column Enhancement

In a column-enhancement embodiment, at step 511, the method 510 displays a data grid 110 according to a first display format. For example, in one embodiment step 511 displays a grid 110 as in FIG. 1A. The grid 110 has a plurality of columns of data displayed simultaneously on the computer display 100. Each column in the plurality of columns includes a plurality of contiguous cells, and each column in the plurality of columns has a first (or "initial") width according to a first display format.

At step 513, the method includes receiving, at the computer, a first user input identifying (or selecting) a first user-selected column from among the plurality of columns. Such identification may be made, for example, by the user clicking on a column with a mouse, or touching a column or row on a touch screen, to name but a few examples. A column may also be selected, for example, by double-clicking or right-clicking on a column, or using a mouse or touch-screen to encircle at least two consecutive cells of the column. For example, a user may select a column 123 for enhancement, as in FIG. 2A.

The plurality of columns in the data grid 110 other than the first user-selected column, define a plurality of "remaining columns."

In response to the first user input selecting a first user-selected column, step 515 includes changing the format of the first user-selected column to a second display format by: expanding the width of the first user-selected column and keeping the remaining columns displayed according to the first display format, and lifting-up the first user-selected column so that it overlaps at a portion of at least one adjacent column. Preferred embodiments also add a shadow or halo 223 around the perimeter of the user-selected column so that the first user-selected column appears to be hovering above at least a portion of at least one other another column of data from the plurality of columns of data.

Subsequently, in embodiments in which the user selects a user-selected column, the method 510 includes, at step 517, re-displaying the plurality of columns of data simultaneously on the computer display, the first user-selected column displayed according to the second display format.

In some embodiments, expanding the width of the first user-selected column includes immediately displaying the first user-selected column in its expanded and lifted-up format, without an intermediate display of the first user-selected column. In other embodiments, expanding the width of the first user-selected column includes animating the user-selected column to lift-up and expand by displaying at least one intermediate image of the first user-selected column in which the width of the first user-selected column is greater than its first (or initial) width but less than its ultimate expanded width.

In some embodiments, in the first format, at least one cell in the first user-selected 123 column displays a truncated version of that cell's data content, and in the second format, that cell displays a less-truncated version of that cell's data content.

In some embodiments, receiving user input identifying the first user-selected column 123 defines a set of adjacent columns 122, 124 immediately adjacent to the first user-selected column; and the user-selected column, when displayed in the second format, partially overlap and partially, but not completely, obscures at least one immediately adjacent column from the set of adjacent columns.

In illustrative embodiments, text or other data in at least one cell 123132 of the first user-selected column 123 is editable, when the user-selected column 123 is displayed in the second format. In other embodiments, in which a column includes at least two cells, text or other data in each cell of the user-selected column is editable, when the user-selected column 123 is displayed in the second format.

In some embodiments, each column of the plurality of remaining columns remains in its initial location when the user-selected column is displayed in the second format. In other words, the location of each column of the plurality of remaining columns remains in the same place, relative to the other remaining columns, when the first user-selected column is displayed in the second format. Moreover, in preferred embodiments, when (prior to the display of the user-selected column in the second format) each column of the plurality of remaining columns has a respective distance from each of the other remaining columns, then each column of the plurality of remaining column maintains that respective distance from each of the other remaining columns when the user-selected column is displayed in the second format.

In some embodiments, the method further includes receiving, at the computer processor, subsequent user input instructing the computer to revert the display of the first user-selected column to the first display format, and subsequently causing the computer to re-display the plurality of columns simultaneously on the computer display, the first user-selected column displayed according to the first display format (e.g., revert the display from the example in FIG. 2A to the example in FIG. 1A).

In some embodiments, the subsequent user input further specifies a different column as a subsequently-selected column, and the method further includes causing the computer to re-display the plurality of columns simultaneously on the computer display 100, the subsequently-selected column 124 displayed by: reducing the width of the first user-selected column 123; and expanding the width of the subsequently-selected column 124, and keeping the remaining columns (e.g., 122, 125, etc.) displayed according to the first display format, and lifting-up the subsequently-selected column 124 so that the subsequently-selected column 124 overlaps at least a portion of at least one adjacent column 123, 125. Preferred embodiments also add a shadow or halo 223 so that the subsequently-selected column appears to hover above at least a portion of at least one other column of data from the plurality of columns of data.

Row Enhancement

In a row-enhancement embodiment, at step 511, the method 510 displays a grid 110, for example as schematically illustrated in FIG. 3A. The grid 110 has a plurality of rows of data displayed simultaneously on the computer display 100. Each row in the plurality of rows includes a plurality of contiguous cells, and each row in the plurality of rows has an initial height according to a first display format.

At step 513, the method includes receiving, at the computer, a first user input identifying (or selecting) a first user-selected row from the plurality of rows. For example, a user may select a row 132 for enhancement, as in FIG. 3B. Such identification may be made, for example, by the user clicking on a row with a mouse, or touching row on a touch screen, to name but a few examples. A row may also be selected, for example, by double-clicking or right-clicking on the row, or using a mouse of touch-screen to encircle at least two consecutive cells of the row. The plurality of rows in the data grid 110, other than the first user-selected row, define a plurality of "remaining rows."

In response to the first user input selecting a user-selected row 132, step 515 includes changing the format of the first user-selected row 132 to a second display format by: expanding the height of the first user-selected row 132 and keeping the remaining rows according to the first display format, and lifting-up the first user-selected row 132 so that the first user-selected row 132 so that the first user-selected row 132 overlaps at least a portion of at least one adjacent row. Preferred embodiments also add a shadow or halo 223 around the perimeter of the user-selected row so that the user-selected row 132 appears to hover above at least a portion of at least one other row 131, 133 of data from the plurality of rows of data.

Subsequently, in embodiments in which the user selects a user-selected row 132, the method 510 includes, at step 517, re-displaying the plurality of rows of data simultaneously on the computer display, the first user-selected row 132 displayed according to the second display format.

In some embodiments, expanding the height of the first user-selected row 132 includes immediately displaying the first user-selected row 132 in its expanded and lifted-up format, without an intermediate display of the first user-selected row. In other embodiments, expanding the height of the first user-selected row includes animating the user-selected row to lift-up and expand by displaying at least one intermediate image of the first user-selected row 132 in which the height of the first user-selected row 132 is greater than its first (or initial) height but less than its ultimate expanded height.

In some embodiments, in the first format, at least one cell 123132 in the user-selected row 132 displays a truncated version of that cell's data content, and in the second format, that cell 123132 displays a less-truncated, or not truncated, version of that cell's data content.

In some embodiments, receiving user input identifying the user-selected row 132 defines a set of adjacent rows immediately adjacent to the user-selected row; and the user-selected row 132, when displayed in the second format, partially overlaps and partially, but not completely, obscures at least one immediately adjacent row 131, 133 from the set of adjacent rows.

In illustrative embodiments, text or other data in at least one cell 123132 of the user-selected row 132 is editable, when the user-selected row 132 is displayed in the second format. In other embodiments, in which the user-selected row 132 includes at least two cells, text or other data in each cell of the user-selected row 132 is editable, when the user-selected row 132 is displayed in the second format.

In some embodiments, each row of the plurality of remaining rows (e.g., 131, 133, etc.) remains in its initial location when the user-selected row is displayed in the second format. In other words, the location of each row of the plurality of remaining rows remains in the same place, relative to the other remaining rows, when the user-selected row 132 is displayed in the second format. Moreover, in preferred embodiments, when (prior to the display of the user-selected row 132 in the second format) each row of the plurality of remaining rows has a respective distance from each of the other remaining rows, then each row of the plurality of remaining rows maintains its respective distance from each of the other remaining rows while the user-selected row is displayed in the second format.

In some embodiments, the method further includes receiving, at the computer processor, subsequent user input instructing the computer to revert the display of the user-selected row to the first display format, and subsequently causing the computer to re-display the plurality of rows simultaneously on the computer display, the user-selected row 132 displayed according to the first display format. For example, an illustrative embodiment would revert to the display in FIG. 3B to the display in FIG. 3A.

In some embodiments, the subsequent user input further specifies a different row as a subsequently-selected row, and the method further includes causing the computer to re-display the plurality of rows simultaneously on the computer display, the subsequently-selected row displayed according to the second display format.

Some embodiments facilitate the ability of a user to enhance the display of another column or row, after previously enhancing the display of a preceding column or row.

Figure 5B:
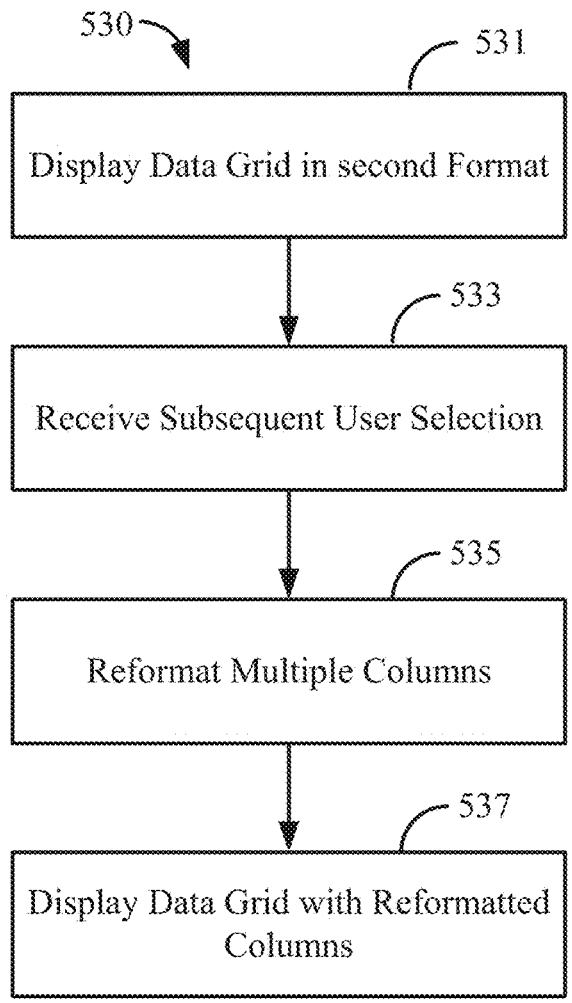
FIG. 5B is a flowchart of a method for an embodiment of changing a display of a data grid on a computer screen.

To that end, FIG. 5B is a flowchart of an embodiment of a method 530 of changing a display of a data grid on a computer screen.

Step 531 includes displaying a data grid with an enhanced column (e.g., a first column), for example according to method 510 of FIG. 5A. An enhanced column is a column that is expanded and displayed as lifted-up above a data grid of which the enhanced column is a part, as described above.

Step 533 includes receiving, at the computer, a user input (which may be referred-to as a "second" user input) identifying a second user-selected column 124 from among the plurality of columns. The second user-selected column 124 is a column that is a different column that the first user-selected column 123 previously enhanced and displayed according to step 531.

Figures 4A, 4B:
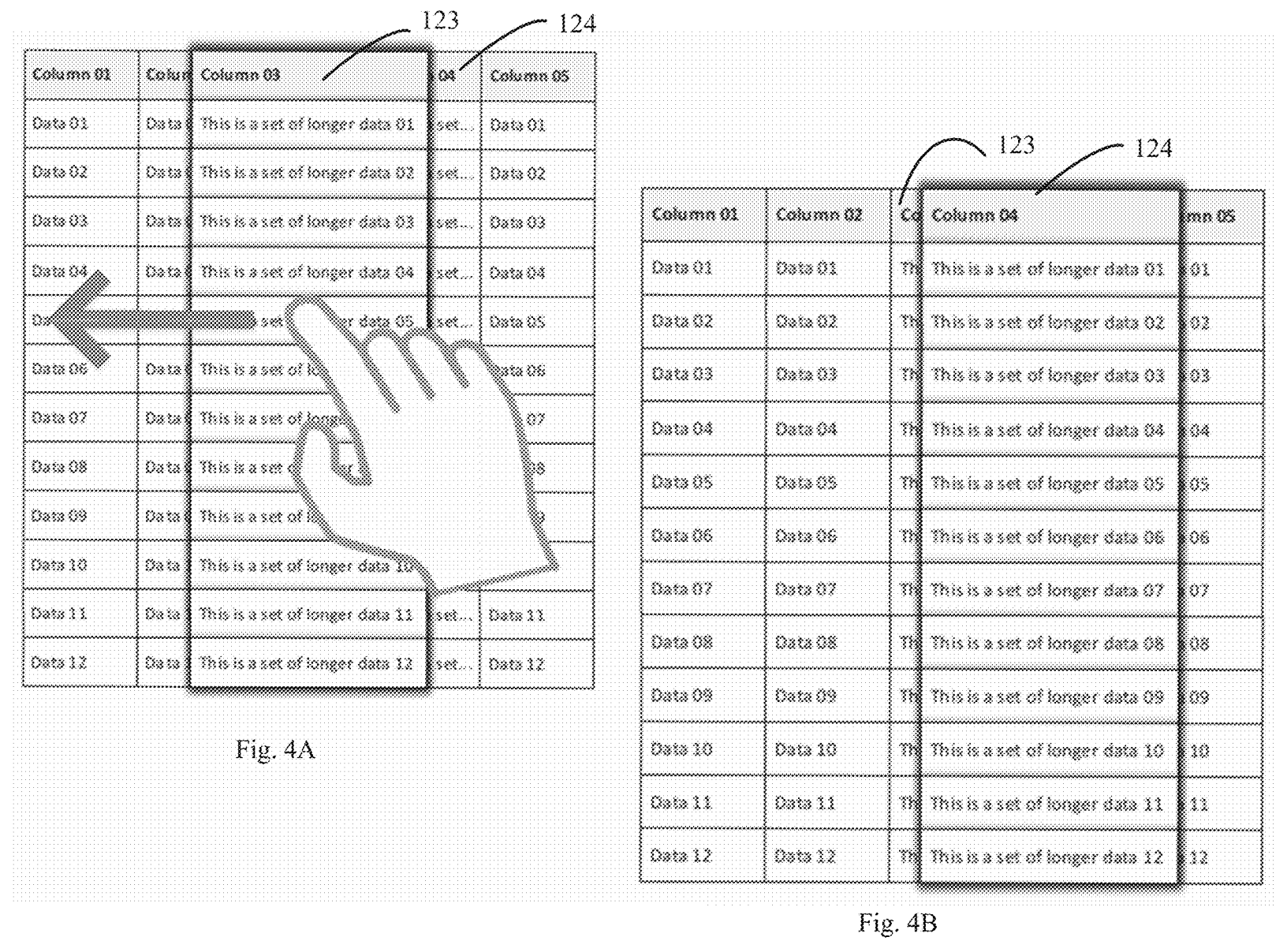

An illustrative example of receiving a second user input is schematically illustrated in FIG. 4A and FIG. 4B. In FIG. 4A, a first user-selected column 123 is displayed in according to a second (enhanced) format (i.e., expanded and uplifted), and adjacent column 124 is displayed according to its first (or initial) format. A user uses a mouse or a touch screen to grab the first user-selected column 123 and swipe left. The act of swiping left does not move the first user-selected column 123. Instead, the act of swiping left indicates, to the computer, that the user wants to (a) reduce the previous expansion of the first user-selected column 123 and revert the display of that column to a non-uplifted format, and (b) enhance the display of the column (in this example, column 124) immediately adjacent to the first user-selected column 123.

To that end, step 535 reformats multiple columns. For example, in response to the second user input, step 535 (i) reduces the width of the first user-selected column 123 so that the first user-selected column 123 has a first reduced width; and (ii) changes the format of the second user-selected column 124 to a third display format by expanding the width of the second user-selected column 124, and lifting-up the second user-selected column 124 so that the second user-selected column 124 overlaps at least a portion of at least one adjacent column 123, 125. In preferred embodiments, step 535 adds a shadow or halo 223 around the second user-selected column so that the second user-selected column appears to be hovering above at least a portion of another column of data from the plurality of columns of data.

Subsequently, at step 537, the method includes re-displaying the plurality of columns of data simultaneously on the computer display, the first user-selected column displayed according to its first reduced width, and the second user-selected column displayed according to the third display format.

Figure 5C:
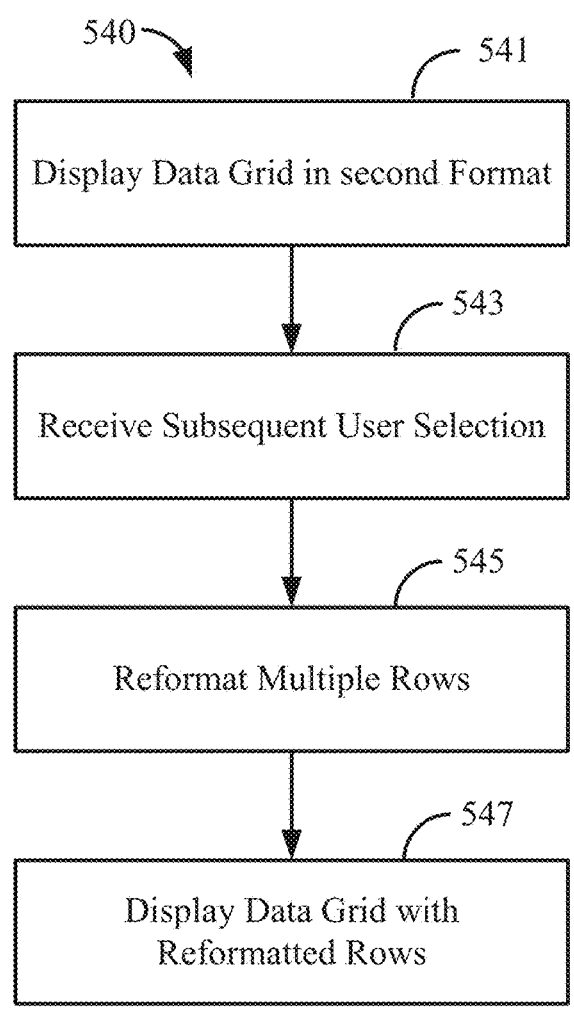
FIG. 5C is a flowchart of a method for an embodiment of changing a display of a data grid on a computer screen.

Another embodiment includes a method 540 of reformatting rows according to the method 540 of FIG. 5C. Step 541 includes displaying a data grid with an enhanced row (e.g., a first user-selected row 132), for example according to method 510 of FIG. 5A.

Step 543 includes receiving, at the computer, a user input (which may be referred-to as a "second" user input) identifying a second user-selected row from among the plurality of rows. The second user-selected row is a row that is a different row than the first user-selected row 132 previously enhanced and displayed according to step 541.

Step 545 reformats multiple rows. For example, in response to the second user input, step 545 (i) reduces the height the first user-selected row so that the first user-selected row has a first reduced height; and (ii) changes the format of the second user-selected row to a third display format by increasing the height of the second user-selected row, and lifting-up the second user-selected row so that the second user-selected row so that the second user-selected row overlaps at least a portion of at least one adjacent row. Preferred embodiments add a shadow or halo 223 around the second user-selected row so that the second user-selected row appears to be hovering above at least a portion of another row of data from the plurality of rows of data.

Subsequently, at step 547, the method includes re-displaying the plurality of rows of data simultaneously on the computer display, the first user-selected row displayed according to its first reduced height, and the second user-selected row is displayed according to the third display format.

Figure 6:
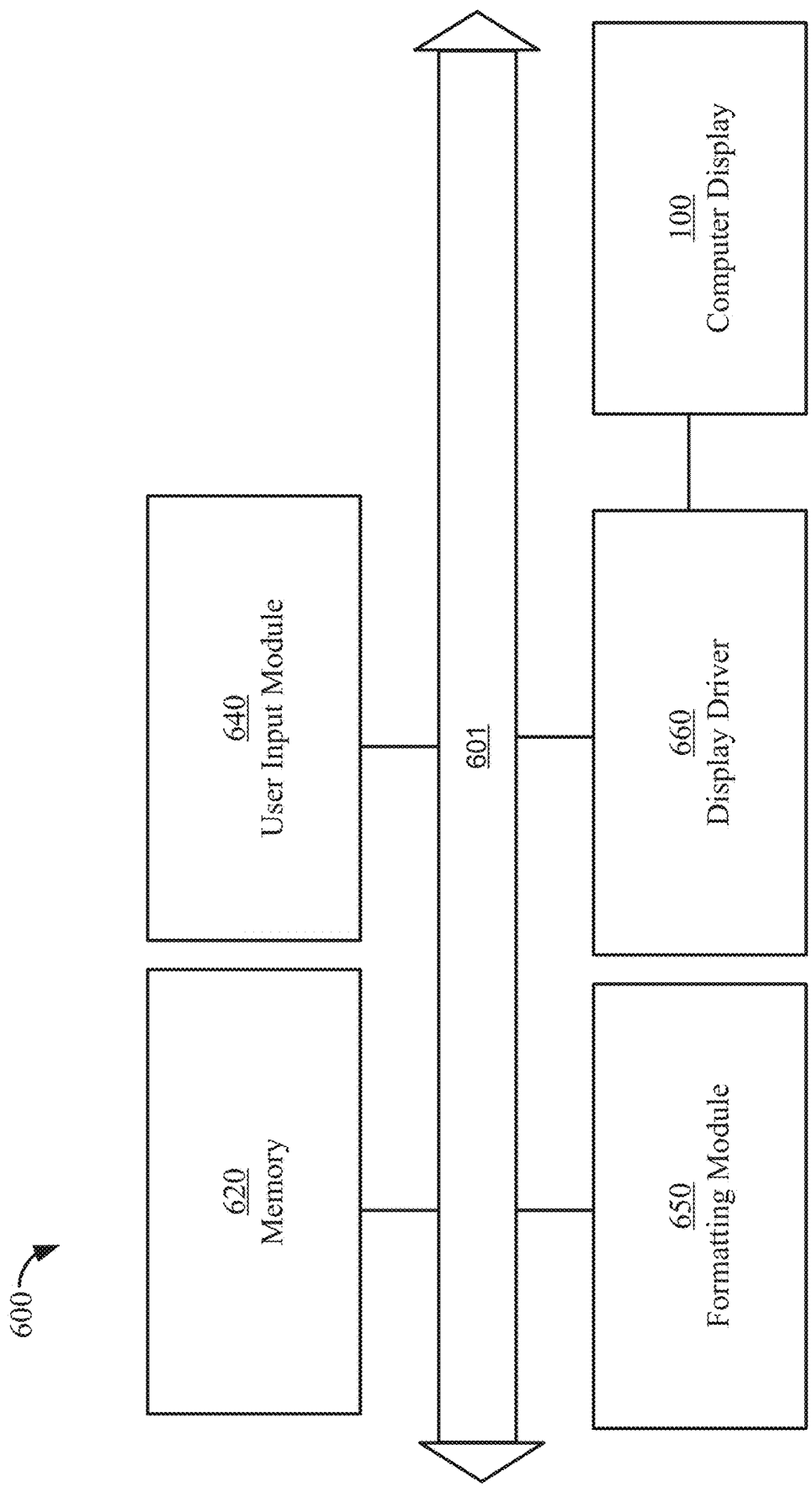
FIG. 6 schematically illustrates an embodiment of a system.

FIG. 6 schematically illustrates an embodiment of a system 600 according to various embodiments described herein. The system 600 includes a plurality of modules coupled in communication with a data bus 601.

The system 600 may be implemented, at least in part, on a computer system or computer processor. The computer processor may a semiconductor microprocessor as understood in the art, such as a microprocessor from Intel or AMD, or an ARM core, to name but a few examples.

The system 600 includes a memory 620, which may be a volatile RAM or a non-volatile memory, to name but a few examples. The memory 620 may store, among other things, instructions that, when executed by the computer processors cause the computer processor to execute steps of the methods described herein.

The system 600 also includes a user input module 640 configured to receive user input from a user, according to methods described herein.

The system 600 also includes a formatting module 650 configured to format and reformat columns and or rows of a data grid, in response to receipt of user input, according to methods described herein.

The system 600 also includes a display driver 660 configured to cause display, on a computer display 100, data grids according to methods described herein.

For example, and without limitation, one embodiment of a system 600 includes a display driver 660 is configured to display, on the computer display, a plurality of data columns, each column in the plurality of data columns comprising a plurality of contiguous cells, the display driver configured to display the plurality of data columns in a first format at a first time, and to display the plurality of data columns in a second format at a second, subsequent time, wherein: in the first format, each data column of the data columns has a respective first column width; and in the second format, a user-selected one of the data columns has a second column width, the second column width being greater than its first column width, and is displayed so that the user-selected column appears to hover above at least a portion of another column from the plurality of displayed data columns, as described above. The user input module 640 is configured to receive, from an operator of the system, specification of a one of the columns as the user-selected column, and the formatting module 650 is configured to controllably reformat the user-selected column from the first format to the second format, based on the user input, and to provide, to the display driver, the user-selected column in the second format for display on the computer display.

In some embodiments, the display driver 660 is configured to display, in each of the first format and the second format, the plurality of columns as a contiguous grid. In some embodiments, display driver is configured to animate the user-selected column to lift-up and expand to the second column width.

In some embodiments, specification of a one of the columns as the user-selected column defines a set of adjacent columns adjacent to the selected column; and wherein: the user-selected column, when displayed in the second format, at least partially overlaps, and at partially obscures, at least one adjacent column from the set of adjacent columns.

In some embodiments, text in at least one cell of the user-selected column is editable, when the user-selected selected column is displayed in the second format.

A listing of certain reference numbers is presented below.
100: Computer display;
101: Window on computer display;
110: Displayed data grid;
121-125: Columns;
131-142: Rows;
223: Shadow or halo;
322: Initial column width;
323: Initial column width;
3232: Expanded column width;
331: Initial row width;
332: Initial row width;
3322: Expanded row width;
333: Initial row width;
334: Initial row width;
324: Initial column width
600: System;
620: Computer memory;
640: User input module;
650: Formatting module;
660: Display driver.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A computer-implemented method for increasing legibility of data displayed on a computer display, the method comprising:
displaying a plurality of rows of data simultaneously on the computer display, each row in the plurality of rows comprising a plurality of contiguous cells, each row in the plurality of rows having a height according to a first display format;
receiving, at the computer, a first user input identifying a first user-selected row from among the plurality of rows, the plurality of rows other than the first user-selected rows defining a plurality of remaining rows;
in response to the first user input, changing the format of the first user-selected row to a second display format by:
expanding the height of the first user-selected row and keeping the remaining rows according to the first display format, and
providing a shadow around a perimeter of the first user-selected row, so that the first user-selected row appears to be hovering above at least a portion of another row of data from the plurality of rows of data; and
re-displaying the plurality of rows of data simultaneously on the computer display, the first user-selected row displayed according to the second display format.

P2. The method of P1, wherein displaying the plurality of rows comprises displaying the plurality of rows as a contiguous grid comprising the plurality of rows.

P3. The method of any of P1-P2, further comprising, after re-displaying the plurality of rows of data simultaneously on the computer display, the user-selected row displayed according to the second display format:
receiving, at the computer, a second user input identifying a second user-selected row from among the plurality of rows;
in response to the second user input:
(a) reducing the height of the first user-selected row so that the first user-selected row has a first reduced height; and
(b) changing the format of the second user-selected row to a third display format by:
expanding the height of the second user-selected row, and
providing a shadow around a perimeter of the second user-selected row, so that the second user-selected row appears to be hovering above at least a portion of another row of data from the plurality of rows of data; and
re-displaying the plurality of rows of data simultaneously on the computer display, the first user-selected row displayed according to its first reduced height, and the second user-selected row displayed according to the third display format.

P4. The method of any of P1-P3, wherein the user input comprises a touch from one of a touch-screen or a computer mouse.

P5. The method of any of P1-P4, wherein expanding the height of the user-selected row comprises animating the user-selected row to lift-up and expand.

P6. The method of any of P1-P5, wherein:
in the first format, at least one cell in the user-selected row displays a truncated version of that cell's data content; and
in the second format, that cell displays a less-truncated version of that cell's data content.

P7. The method of any of P1-P6, wherein:
receiving user input identifying the user-selected row defines a set of adjacent rows immediately adjacent to the user-selected row; and wherein:
the user-selected row, when displayed in the second format, partially but not completely obscures at least one immediately adjacent row from the set of adjacent rows.

P8. The method of any of P1-P7, wherein text in at least one cell of the user-selected row is editable, when the user-selected row is displayed in the second format.

P9. The method of any of P1-P8, wherein text in each cell of the user-selected row is editable, when the user-selected row is displayed in the second format.

P10. The method of any of P1-P9, wherein each row of the plurality of rows remains in its initial location when the user-selected row is displayed in the second format.

P11. The method of any of P1-P10, further comprising:

receiving, at the computer processor, subsequent user input instructing the computer to revert the display of the user-selected row to the first display format; and causing the computer to re-display the plurality of rows simultaneously on the computer display, the user-selected row displayed according to the first display format.

P12. The method of P11, wherein:

the subsequent user input further specifies a different row as a subsequently-selected row, and the method further comprises:

causing the computer to re-display the plurality of rows simultaneously on the computer display, the subsequently-selected row displayed according to the second display format.

P21. A computer-implemented system configured to increase legibility of data displayed on a computer display, the system comprising:

a display driver configured to display, on the computer display, a plurality of data rows, each row in the plurality of data rows comprising a plurality of contiguous cells, the display driver configured to display the plurality of data rows in a first format at a first time, and to display the plurality of data rows in a second format at a second time, wherein:

in the first format, each data row of the data rows has a respective first row height; and in the second format, a user-selected one of the data rows:

has a second row height, the second row height being greater than its first row height, and providing a shadow around a perimeter of the user-selected row appears to hover above at least a portion of another row from the plurality of displayed data rows;

a user input module configured to receive, from an operator of the system, specification of a one of the rows as the user-selected row;

a formatting module configured to:

controllably reformat the user-selected row from the first format to the second format, based on the user input; and provide, to the display driver, the user-selected row in the second format for display on the computer display.

P22. The system of P21, wherein the display driver is configured to display, in each of the first format and the second format, the plurality of rows as a contiguous grid.

P23. The system of any of P21-P22, wherein, in the second format, the user-selected row is animated to lift-up and expand to the second row height.

P24. The system of any of P21-P23, wherein:

specification of a one of the rows as the user-selected row defines a set of adjacent rows adjacent to the selected row; and wherein:

the user-selected row, when displayed in the second format, at least partially obscures at least one adjacent row from the set of adjacent rows.

P25. The system of any of P21-P24, wherein text in at least one cell of the user-selected row is editable, when the user-selected selected row is displayed in the second format.

P31. A non-volatile computer-program product storing computer-executable code, which computer-executable code, when executed by a computer processor, causes the computer processor to perform a method comprising:

displaying a plurality of rows of data simultaneously on a computer display, each row in the plurality of rows comprising a plurality of contiguous cells, each row in the plurality of rows having a respective height according to a first display format;

receiving, at the computer processor, user input identifying a user-selected row of data from among the plurality of rows of data, the user-selected row having a height;

changing the format of the user-selected row to a second display format by:

expanding the height of the user-selected row, and providing a shadow around a perimeter of the user-selected row so that the user-selected row appears to be hovering above at least a portion of another row of data from the plurality of rows of data; and re-displaying the plurality of rows of data simultaneously on the computer display, the user-selected row displayed according to the second display format and the rows other than the user-selected row displayed according to the first display format.

P32. A non-volatile computer-program product of P31, wherein the method comprises displaying the plurality of rows as a contiguous grid comprising the plurality of rows.

P33. A non-volatile computer-program product of P31, wherein text in each cell of the user-selected row is editable, when the user-selected row is displayed in the second format.

P41. A non-volatile computer-program product storing computer-executable code, which computer-executable code, when executed by a computer processor, causes the computer processor to perform a method to any of P1-P12.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for increasing legibility of data displayed on a computer display, the method comprising:
    displaying a plurality of columns of data simultaneously on the computer display, each column in the plurality of columns comprising a plurality of contiguous cells, each column in the plurality of columns having a respective first width according to a first display format;
    receiving, at the computer, a first user input identifying a first user-selected column from among the plurality of columns, the plurality of columns other than the first user-selected column defining a plurality of remaining columns;
    in response to the first user input, changing the format of the first user-selected column, the first user-selected column being the same graphically displayed column as actually selected by the first user input, to a second display format by:
        expanding the width of the first user-selected column to a second width, and keeping each of the remaining columns according to their respective first width, and
        lifting-up the first user-selected column so that the first user-selected column overlaps at least a portion of another column of data from the plurality of columns of data; and
    re-displaying the plurality of columns of data simultaneously on the computer display, the first user-selected column displayed in its original location and according to the second display format.

2. The method of claim 1, wherein displaying the plurality of columns comprises displaying the plurality of columns as a contiguous grid comprising the plurality of columns.

3. The method of claim 1, further comprising, after re-displaying the plurality of columns of data simultaneously on the computer display, the user-selected column displayed according to the second display format:
    receiving, at the computer, a second user input identifying a second user-selected column from among the plurality of columns;
    in response to the second user input:
        (a) reducing the second width of the first user-selected column so that the first user-selected column has a first reduced width; and
        (b) changing the format of the second user-selected column to a third display format by:
            expanding the first width of the second user-selected column to a third width greater than its first width, and
            lifting-up the second user-selected column so that the second user-selected column overlaps at least a portion of another column of data from the plurality of columns of data; and
        re-displaying the plurality of columns of data simultaneously on the computer display, the first user-selected column displayed according to its first reduced width, and the second user-selected column displayed according to the third display format.

4. The method of claim 1, wherein changing the format of the first user-selected column to a second display format further comprises displaying a shadow around a perimeter of the first user-selected column so that the first user-selected column appears to hover above a portion of another column of data from the plurality of columns of data.

5. The method of claim 1, wherein the user input comprises a touch from one of a touch-screen or mouse input from a computer mouse.

6. The method of claim 1, wherein expanding the width of the first user-selected column comprises animating the user-selected column to lift-up and expand.

7. The method of claim 1, wherein:
    in the first format, at least one cell in the first user-selected column displays a truncated version of that cell's data content; and
    in the second format, said at least one cell displays a less-truncated version of that cell's data content.

8. The method of claim 1, wherein:
    receiving user input identifying the first user-selected column defines a set of adjacent columns immediately adjacent to the user-selected column; and wherein:
    the first user-selected column, when displayed in the second format, partially but not completely obscures at least one immediately adjacent column from the set of adjacent columns.

9. The method of claim 1, wherein text in at least one cell of the first user-selected column is editable, when the first user-selected column is displayed in the second format.

10. The method of claim 1, wherein the first user-selected column comprises a plurality of cells, and text in each cell of the first user-selected column is editable, when the first user-selected column is displayed in the second format.

11. The method of claim 1, wherein each column of the remaining plurality of columns remains in its initial location when the first user-selected column is displayed in the second format.

12. The method of claim 1, further comprising:
    receiving, at the computer processor, subsequent user input instructing the computer to revert the display of the first user-selected column to the first display format; and
    causing the computer to re-display the plurality of columns simultaneously on the computer display, the first user-selected column displayed according to the first display format.

13. A computer-implemented system configured to increase legibility of data displayed on a computer display, the system comprising:
    a display driver configured to display, on the computer display, a plurality of data columns, each column in the plurality of data columns comprising a plurality of contiguous cells, the display driver configured to display the plurality of data columns in a first format at a first time, and to display the plurality of data columns in a second format at a second time, wherein:
in the first format, each data column of the data columns has a respective first column width; and
in the second format, a user-selected one of the data columns has a column perimeter, and:
has a second column width, the second column width being greater than its first column width, and
has a halo around the column perimeter, and
is displayed so that the user-selected column appears to hover above at least a portion of another column from the plurality of displayed data columns;
a user input module configured to receive, from an operator of the system after displaying the plurality of data columns in the first format at the first time, specification of a one of the columns as the user-selected column;
a formatting module configured to:
controllably reformat the user-selected column from the first format to the second format, in response to the user input; and
provide, to the display driver, the user-selected column in the second format for display, at the second time, on the computer display.

14. The system of claim 13, wherein the display driver is configured to display, in each of the first format and the second format, the plurality of columns as a contiguous grid.

15. The system of claim 13, wherein, in the second format, the user-selected column is animated to lift-up and expand to the second column width.

16. The system of claim 13, wherein:
specification of a one of the columns as the user-selected column defines a set of adjacent columns adjacent to the selected column; and wherein:
the user-selected column, when displayed in the second format, at least partially obscures at least one adjacent column from the set of adjacent columns.

17. The system of claim 13, wherein text in at least one cell of the user-selected column is editable, when the user-selected selected column is displayed in the second format.

18. A non-volatile computer-program product storing computer-executable code, which computer-executable code, when executed by a computer processor, causes the computer processor to perform a method comprising:
displaying a plurality of columns of data simultaneously on a computer display, each column in the plurality of columns comprising a plurality of contiguous cells, each column in the plurality of columns having a respective first width according to a first display format;
receiving, at the computer processor, user input identifying a first user-selected column of data from among the plurality of columns of data, the first user-selected column being in a specific location on the computer display;
changing the format of the user-selected column to a second display format by:
expanding the first width of the first user-selected column, and
lifting-up the user-selected column and adding a shadow around a perimeter of the user-selected column so that the user-selected column appears to hover above at least a portion of another column of data from the plurality of columns of data; and
re-displaying the plurality of columns of data simultaneously on the computer display at the specific location on the computer display, the first user-selected column displayed according to the second display format and the columns other than the user-selected column displayed according to the first display format.

19. A non-volatile computer-program product of claim 18, wherein the method comprises displaying the plurality of columns as a contiguous grid comprising the plurality of columns.

20. A non-volatile computer-program product of claim 18, wherein the first user-selected column comprises a plurality of contiguous cells, and text in each cell of the user-selected column is editable, when the first user-selected column is displayed in the second format.

* * * * *